US006079280A

United States Patent [19]

Miller et al.

[11] Patent Number: 6,079,280

[45] Date of Patent: Jun. 27, 2000

[54] INSERTION PADDLE WHEEL FLOW SENSOR FOR INSERTION INTO A FLUID CONDUIT

[75] Inventors: Harold M. Miller, South Chatham; Charles A. Woringer, North Falmouth, both of Mass.

[73] Assignee: Data Industrial Corporation, Mattapoisett, Mass.

[21] Appl. No.: 09/066,954

[22] Filed: Apr. 28, 1998

[51] Int. Cl.[7] .............................. G01F 15/00; B63H 1/26

[52] U.S. Cl. .................................... 73/861.77; 73/861.87; 416/223 R

[58] Field of Search ............................ 73/861.77, 861.79, 73/861.78, 861.87, 187; 416/223 R, 243; 417/436; D12/306; 440/90

[56] References Cited

U.S. PATENT DOCUMENTS

| | | | |
|---|---|---|---|
| 3,457,782 | 7/1969 | Maeder et al. . | |
| 3,531,988 | 10/1970 | Casani et al. . | |
| 4,404,860 | 9/1983 | Wood et al. | 73/861.78 |
| 4,507,960 | 4/1985 | Hufnagel et al. . | |
| 4,590,805 | 5/1986 | Baird et al. | 73/861.87 |
| 4,656,873 | 4/1987 | Stewart | 73/861.33 |
| 4,825,708 | 5/1989 | Sevick . | |
| 4,898,029 | 2/1990 | Boucher | 73/187 |
| 4,936,151 | 6/1990 | Tokio | 73/861.87 |
| 5,721,383 | 2/1998 | Franklin et al. | 73/861.77 |

*Primary Examiner*—Harshad Patel

*Attorney, Agent, or Firm*—Burns, Doane, Swecker & Mathis, L.L.P.

[57] ABSTRACT

A flow sensor using induction pickup and having an improved paddle wheel type impeller within an impeller housing having a concave opening defining a protective skirt area for shielding a portion of the paddle wheel and a stem of the paddle wheel with a varying thickness for reducing cavitational backflow and therefore achieving a precise measurement of the fluid flow velocity and a high turndown ratio is disclosed.

32 Claims, 9 Drawing Sheets

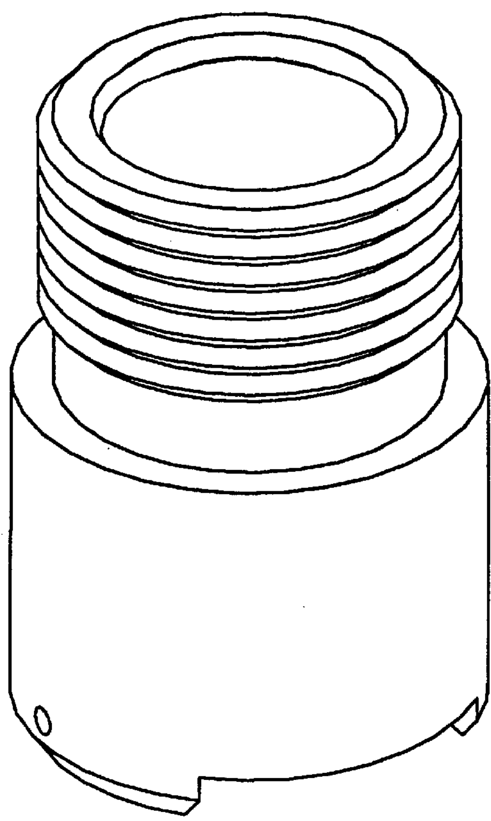
FIG. 2d
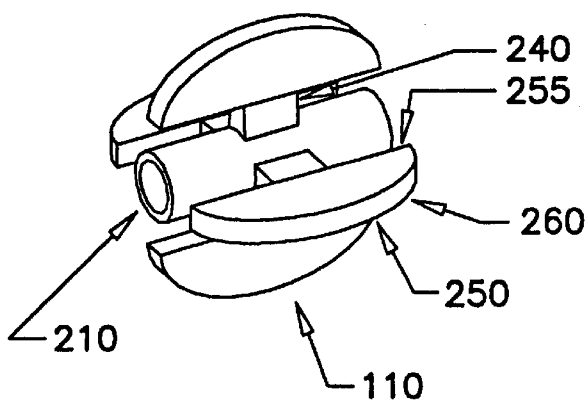
FIG. 2a
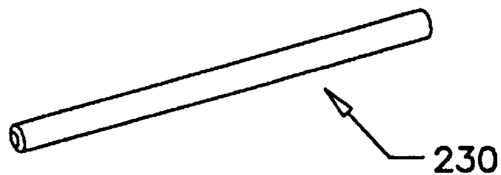
FIG. 2c
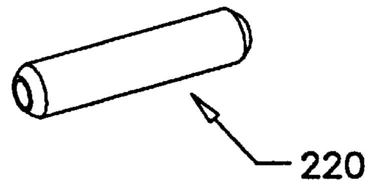
FIG. 2b
FIG. 2e
FIG. 2f

INSERTION PADDLE WHEEL FLOW SENSOR FOR INSERTION INTO A FLUID CONDUIT

FIELD OF THE INVENTION

The present invention relates to a flow sensor using an induction pickup for sensing the rotation of an austenitic stainless steel non-magnetic impeller in order to measure the flow rate of fluid materials, and more specifically to an impeller flow sensor having a large turndown ratio that determines flow rate for fluid flowing within a pipe and having a variable insertion depth into the pipe to accommodate flow measurement in a wide range of pipe sizes.

BACKGROUND OF THE INVENTION

The use of flow sensors for measuring the velocity of fluid flow in closed conduits is well known. Typical flow sensors include U.S. Pat. No. 4,404,860 issued to Wood et al., 4,936,151 issued to Tokio and 4,656,873 issued to Stewart. These sensors utilize various methods for converting various phenomena associated with the dynamics of fluid flow into conveniently measured analogs thereof. These analogs, by calibration, can be used to measure the rate of the fluid flow velocity. One major method of measuring fluid velocity is to determine the rotational velocity of rotary devices driven by the fluid, utilizing electro mechanical means to determine that rotational velocity, as an analog of the average velocity of the fluid. Conventional flow sensors of this type used in determining flow rate are characterized by a turndown ratio. This ratio is defined as a measure of the dynamic range of response of a given sensor over which the accuracy of the sensor output, referred to as the average actual flow rate in the pipe, is within a specified limits. Typical flow sensors of the impeller type have turndown ratios of 10:1 to 40:1. For example, if a flow sensor is able to measure flow velocity ranging from 1 ft./sec. to 25 ft./sec, then its turndown ratio is 25:1. The flow rate of the fluid is linearly proportional to the rate of rotation of the above mentioned electro mechanical means such as an impeller within this range.

Having a low turndown ratio does not provide the necessary versatility to a flow sensor. A low ratio results from the inability of a flow sensor to measure flow rate that is substantially higher or substantially lower than the normal or average flow rate. A flow sensor with a low turndown ratio would appear to measure these flow rates but the accuracy of these readings would be suspect.

Existing impeller type flow sensors typically contain impellers having a broad range of diameters. Large diameter impellers, as a result of their size, cannot be used for measuring flow rate in pipes with small diameters and typically have high rotatory inertia values. The high values increase the response time of these impellers to changes in flow. However, they offer convenience in transduction methods and, frequently, savings in the costs of producing both the impeller and its associated transduction system. A small diameter impeller, on the other hand, generally can be used in smaller pipe sizes, has lower rotatory inertia and concomitant faster response.

Accurate measurement of fluid velocity depends upon the hydrodynamic properties of the fluid as it interacts with the rotating impeller. Thus, an accurate measurement of the fluid flow velocity is not obtained when the impeller and its supporting system are not designed to minimize the hydrodynamic disturbances it generates in the flowing fluid.

SUMMARY OF THE INVENTION

What is desired, therefore, is a flow sensor with a small diameter and a large turndown ratio that is capable of precisely measuring fluid flow velocity and minimizing hydrodynamic disturbances.

A flow sensor of the present invention comprises an impeller housing, an impeller, an inductive pickup, a sensing circuitry and a coil. The impeller and the inductive pickup are housed within the impeller housing. The impeller housing is cylindrical with an opening on either end. One end of the housing is inserted, perpendicularly, into the circumference of a fluid conduit such as a pipe. The inserted end has a concave opening defining a skirt to prevent impingement of fluid flow into the skirt. The impeller is located within the concave end of the housing.

The impeller provides the means of measuring flow rate in two directions. The impeller comprises a paddle wheel with a plurality of blade portions. The blade portions extend radially outward from an axle. The axle is attached to the impeller housing in order to facilitate the rotatable mounting of the impeller in the concave opening of the impeller housing and to have at least one of the blade portions extend outside of the impeller housing beyond the concave opening. As inserted into the fluid conduit, the face of the blade is perpendicular to the direction of the fluid flow such that the flow causes the blades to rotate at a rate that is proportional to the fluid flow velocity.

The inductive pickup is located within the other end (i.e., away from the end that is inserted into the fluid conduit) of the impeller housing. The pickup produces a signal when an impeller blade rotates through a field associated with the pickup. The sensing circuitry is connected to the housing for determining a velocity of the fluid in response to a signal from the pickup.

BRIEF DESCRIPTION OF THE DRAWINGS

These and other objects, features and advantages of the present invention will be readily apparent to one skilled in the art from the following written description, read in conjunction with the drawings, in which:

FIGS. 2*a*, 2*b*, 2*c* and 2*d* are perspective views of, respectively, a paddle wheel, a bearing, an axle and a housing which make up the impeller and impeller housing according to an embodiment of the present invention;

A FIGS. 2*e* and 2*c* illustrate perspective views of various type of bearings;

DETAILED DESCRIPTION

The present invention is designed to operate in fluids having certain levels of particulates within the fluid flow.

These particulates can be, for example: rust, scaling, sand and extraneous vegetable matter. The flow sensor of the present invention is to be employed primarily in aqueous surroundings. The aqueous surroundings range from bases with a high pH level to acids having a low pH level. Operating temperature for the flow sensor varies from 20° F. to 300° F. The operating pressure is typically less than 400 psi even though in testing, the flow sensor has operated at pressures of up to 1000 psi. Prototype versions of flow sensor have operated successfully in pipes having a diameter of 0.50 inch to 12 inches without altering its size. Extension to larger pipe diameters is expected to be relatively simple. In order to facilitate this range, the flow sensor of the present invention requires calibration for the for each specific pipe diameter.

The flow sensor of the present invention includes a paddle wheel type impeller having a 0.800 inch diameter. As a result, the size of the sensor can be minimal. There are several advantages to having a small sensor. Its size leads to less intrusion in the flow stream. The small size and the shape of the impeller minimizes its resistance to flow, extends the low flow rate range, and minimizes the rotatory inertia of the rotating parts. Smaller size also results in simplicity of installation. Given the small size of the impeller blades, there is a reduced sensor area that is exposed to the fluid. A reduced wetted area of the sensor results in lower hydrostatic forces that tend to extrude the sensor from the pipe or other fluid conduit in which it is installed. As a result, higher pressure designs are easier to implement. Given its size, its construction involves few materials. The cost of the sensor is also low because few expensive materials need to be used for its construction.

The flow sensor has an extremely large turndown ratio of in excess of 250:1. The paddle wheel operates from less than 1 RPM to more than 250 RPM. Actual range of flow rates depend upon internal pipe diameter and conditions of flow within the pipe or other conduit into which the sensor is inserted.

In order to promote a complete understanding of the present invention, elements of the flow sensor will be described with respect to the figures.

Figure 1:
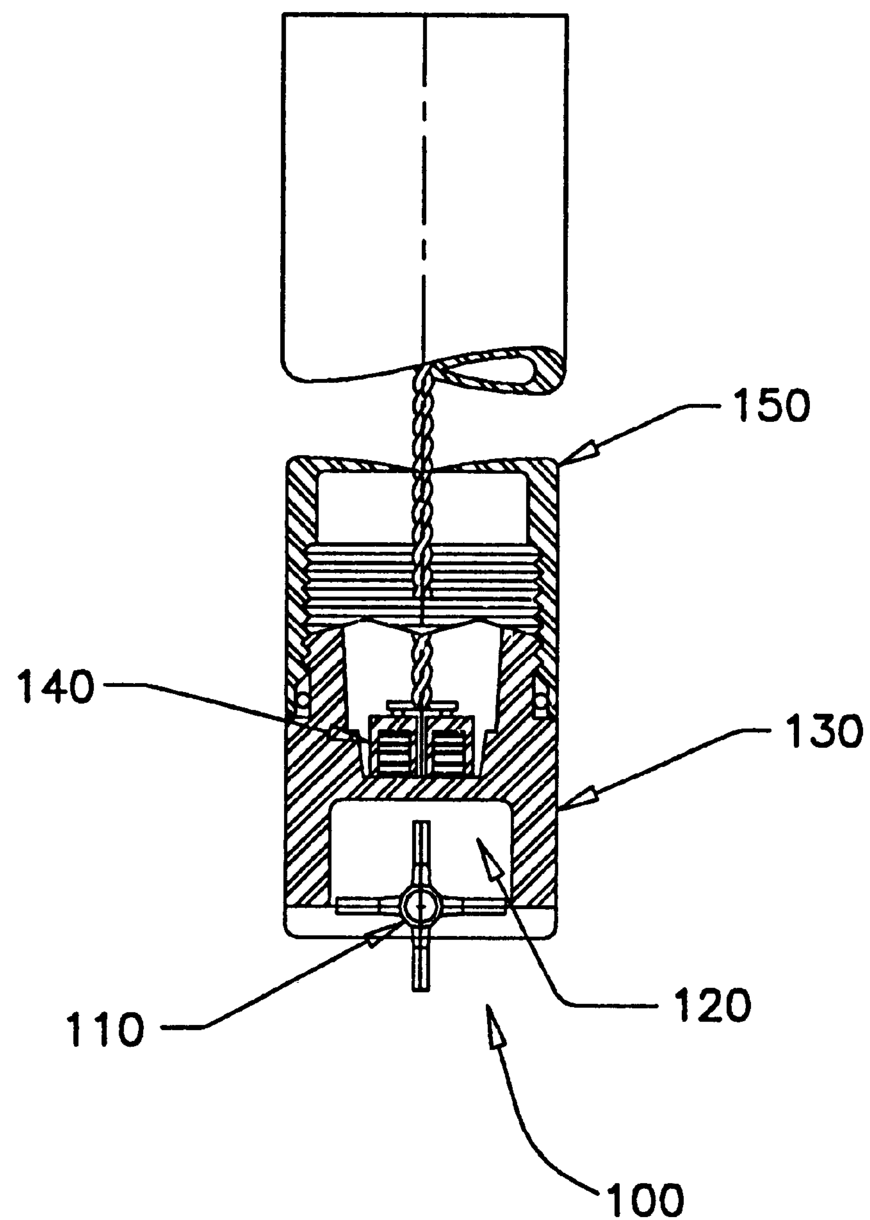
FIG. 1 is a partially cross-sectional view of a flow sensor with a paddle wheel type impeller, housing and induction pickup according to an embodiment of the present invention.
Figure 3:
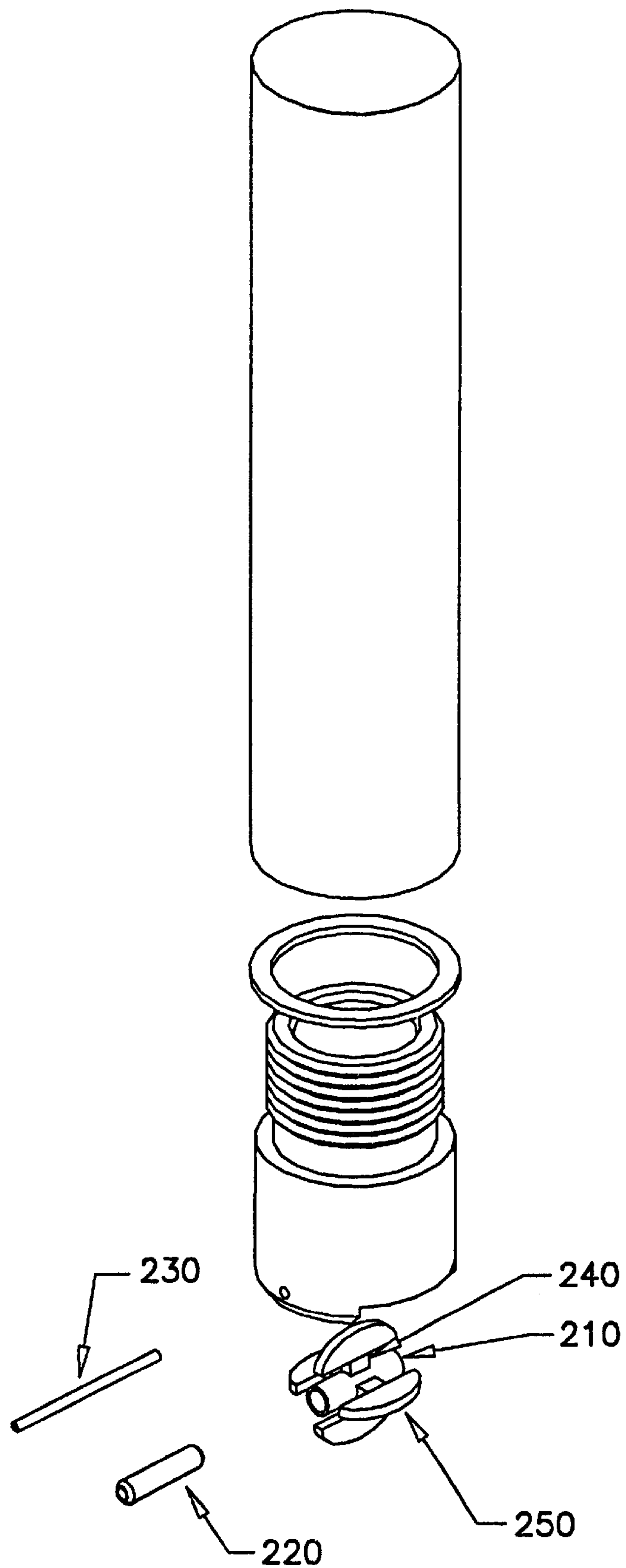
FIG. 3 is a perspective, exploded view of the impeller and impeller housing according to an embodiment of the present invention.
Figure 4:
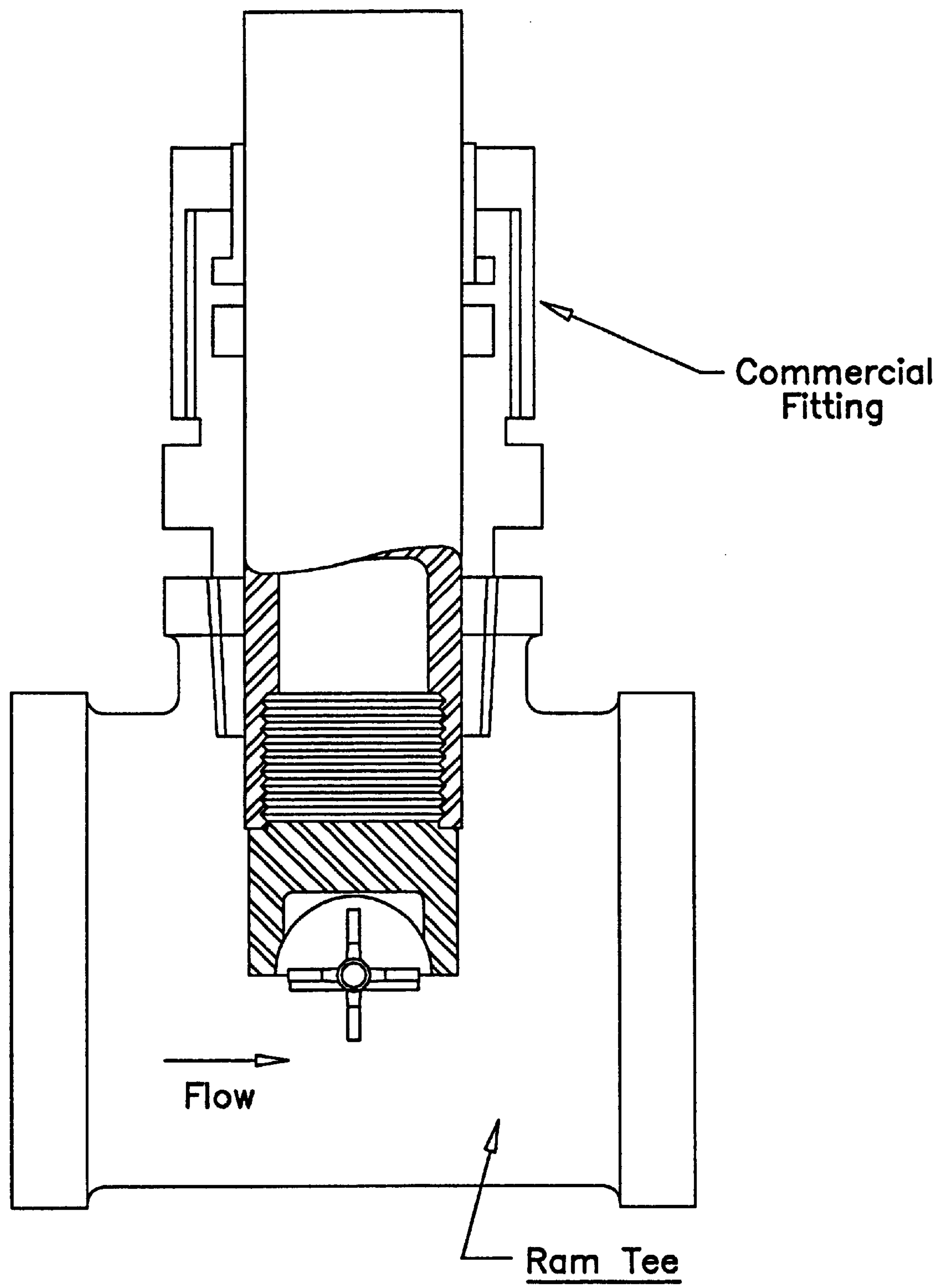
FIG. 4 illustrates the fluid flow sensor according to an embodiment of the present invention as it is installed in a pipe that is utilized for fluid flow.
Figure 5:
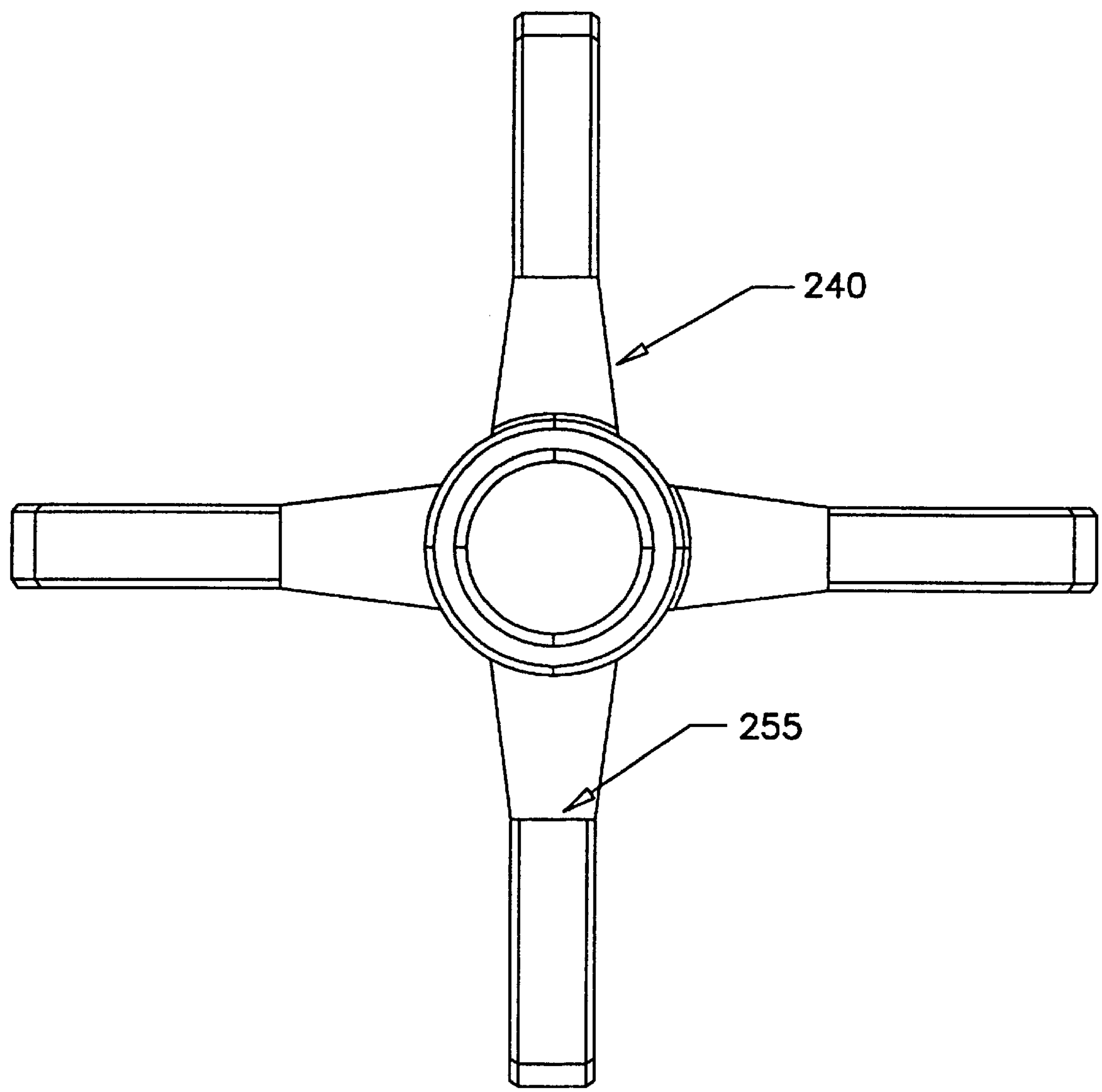
FIG. 5 is a perspective side view of the paddle wheel illustrating the varying thickness of the stem portion of the impeller.
Figure 6D:
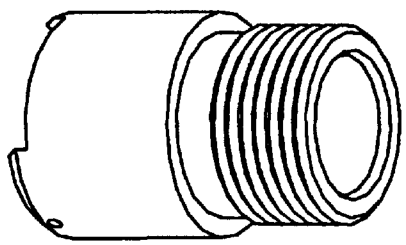
FIGS. 6*a*–6*g* illustrate the various views of the skirt portion of the impeller housing.
Figure 6G:
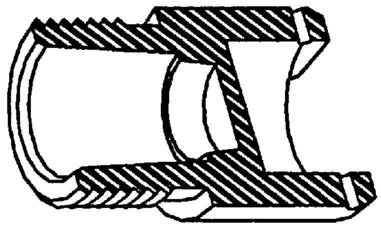
Figure 6C:
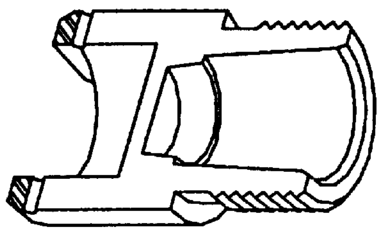
Figure 6F:
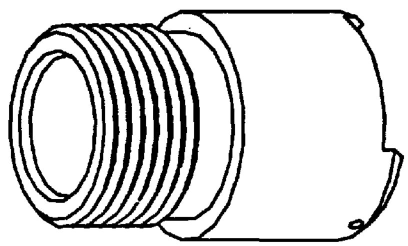
Figure 6B:
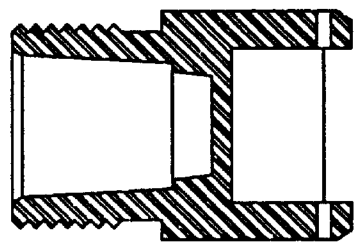
Figure 6E:
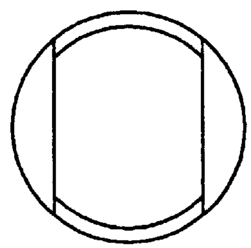
Figure 6A:
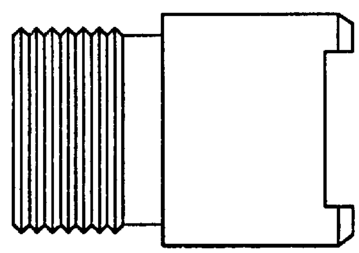

The flow sensor 100 of FIG. 1, as installed in a pipe, is generally composed of a paddle wheel type impeller 110, an impeller housing 130 with a concave opening 120 at one end and an inductive pickup 140 at the other end, and a tubing carrier 150 for the impeller housing permitting radial adjustment, with respect to the fluid carrying pipe or conduit, of the sensor so as to locate the impeller at a desired distance within the pipe.

With reference to FIG. 2*a*, the impeller 110 is preferably in the form of a paddle wheel. The impeller 110 includes a cylindrical hub portion 210, a plurality of stem portions 240 and a plurality of blade portions 250 each being attached by one of the stem portions 240 to the hub portion 210. The impeller is fabricated from corrosion resistant materials, preferably non-magnetic austenitic stainless steel.

The hub portion 210 is cylindrical with openings on either end to define a longitudinal passage within. On the external surface of the hub, the plurality of stem portions 240 project radially outwardly and perpendicularly to the circumference of the hub portion 210. These stems are spaced at equal distance (i.e., they are perpendicular) from each other along the circumference of the hub portion 210. The stems end in a blade portion 250. The blade portion 250 is of a substantially semi-circular shape. A circular outer edge portion 260 of the blade is distal from the stem portion 240. An inner portion 255 of the blade is preferably straight and joins the stem portion 240. The blade portion 250 is flat and is installed in the pipe perpendicular to the direction of flow. It rotates as the fluid impinges on its upstream face.

Inside the hub portion 210 is a bearing 220, various types of which are illustrated in FIGS. 2*b*, 2*e* and 2*f*. The bearing is positioned within the longitudinal passage of the hub portion and made of low friction plastic, such as ultra high molecular weight polyethylene (UHMWPE), Teflon or jeweled bearings.

A cylindrical axle 230, seen in FIG. 2*c*, facilitates the attachment of the paddle wheel to the impeller housing 120 and is located within the bearing 220. The axle also enables the rotation of the paddle wheel by fluid acting on any of the blade portions 250. The axle is preferably made of high hardness corrosion resistant material. For normal application in aqueous media, tungsten carbide or ceramic materials are preferred. In specific corrosive environments, the material may be changed to one that is specific to the corrodent.

The stem portions 240 are fabricated from the same corrosion resistant austenitic stainless steel, as the hub portion and the blades. (The hub with stems and blades may be constructed as an integral one piece shaped part.) The stem portions 240 have varying thickness. At the first junction formed by the stem portion 240 and the inner end 255 of the blade, the thickness of the stem portion 240 is equal to the thickness of the blade portion 250. The thickness of the stem portion 240 at a second junction, formed where the stem joins the hub portion 210, however, is greater than the thickness of the stem portion 240 at the first junction. Therefore, the thickness of the stem portion 240 increases from the junction with the blade portion 250 to the junction with the hub portion 210. Tests have shown this to be advantageous for production of this impeller design.

The presence of the stem portion 240, as opposed to carrying the blade portion directly to the hub, facilitates the shedding of the fluid from the blade portion prior to the blade portion entering the skirt area 120. The skirt area 120 is defined by the concave opening of the impeller housing. Thus, cavitational effects of the fluid entering the skirt area 120 are reduced. Reduction of the cavitational effects, along with the less restricted circulation inside the skirt area, results in flow velocity measurements having a high precision, with an error margin of 1% to 1.5%, and a very high turndown ratio. The number of blades, i.e., preferably, four, further enhances the ability of the flow sensor of the present invention to obtain an accurate measurement of the fluid flow velocity as described above. The shape and number of the blades enhances the hydrodynamics of the paddle wheel impeller of the present invention.

The length of the impeller hub 210 when assembled with bearing 220, is slightly (0.04 inch) narrower than the width of the surrounding concave end 120 of the impeller housing 130. This provides a protrusion of bearing 220 from each end of the impeller hub 210, which acts as a bearing between the hard abrasive material of the impeller 110 when it is in contact with the walls of the concavity 120, thus reducing any wear that might result if the impeller under dynamic conditions shifts enough to abrade the wall. The clearance also facilitates passage of any small particulate material in the flow stream and helps prevent wedging of such fine particulates in between the impeller and wall, which could result in binding of the impeller. In the direction of fluid flow, the length of the hub portion with bearing installed is less than (0.005 inch) the length of the blade portion 250, to prevent dynamic interference of the blade with the side walls of the concavity 120 and prevent the above mentioned interference from fine entrained particulates. The four stems 240, one carrying each blade, are centrally located on the hub and each has an axial width that is one-fourth of the hub length and a depth equivalent to the blade thickness. The hub portion width is 0.550 inches and the blade portion width is 0.495 inches. The extension of the stem 240 from the hub to the inside edge of the blade 255 is 0.113 inches.

The shape of the blades 250 (i.e. circular arcs) leads to a reduction of cavitational backflow within the skirt 120 into which the blades rotate. The blades are also metallic, preferably, austenitic stainless steel. The circular arc shape of the blade 250 also facilitates the use of this sensor in pipes with a diameter slightly greater than the length of the hub portion 210 as the circular arc outer edge 250 closely resembles the curvature of a circular pipe within which a fluid flows. The transition from the circular arc outer edge 250 to the outside width of the blade is modified on both ends of the blade to be a smaller arc to prevent dynamic interference of the blade with the skirt profile at the junction of the skirt with the concavity walls.

Upon the installation of the impeller 110 in a pipe having fluid flow, at least one (and at most, two) blades of the paddle wheel are exposed to the fluid flow. As a result, at least two of the blades are always positioned within the skirt area 120. The inner end 255 of the blade portion 250 is perpendicular to the direction of the fluid flow. With this arrangement, the blade portion 250 comes into contact with the fluid flow and the paddle wheel rotates as a result of a torque on the paddle wheel caused by the fluid flow impinging on it. Over the dynamic range described by the turndown ratio, the rate of rotation of the impeller is linearly related to the rate of flow of the fluid through the pipe. This allows the flow sensor to measure the flow rate of the fluid.

Figure 7A:
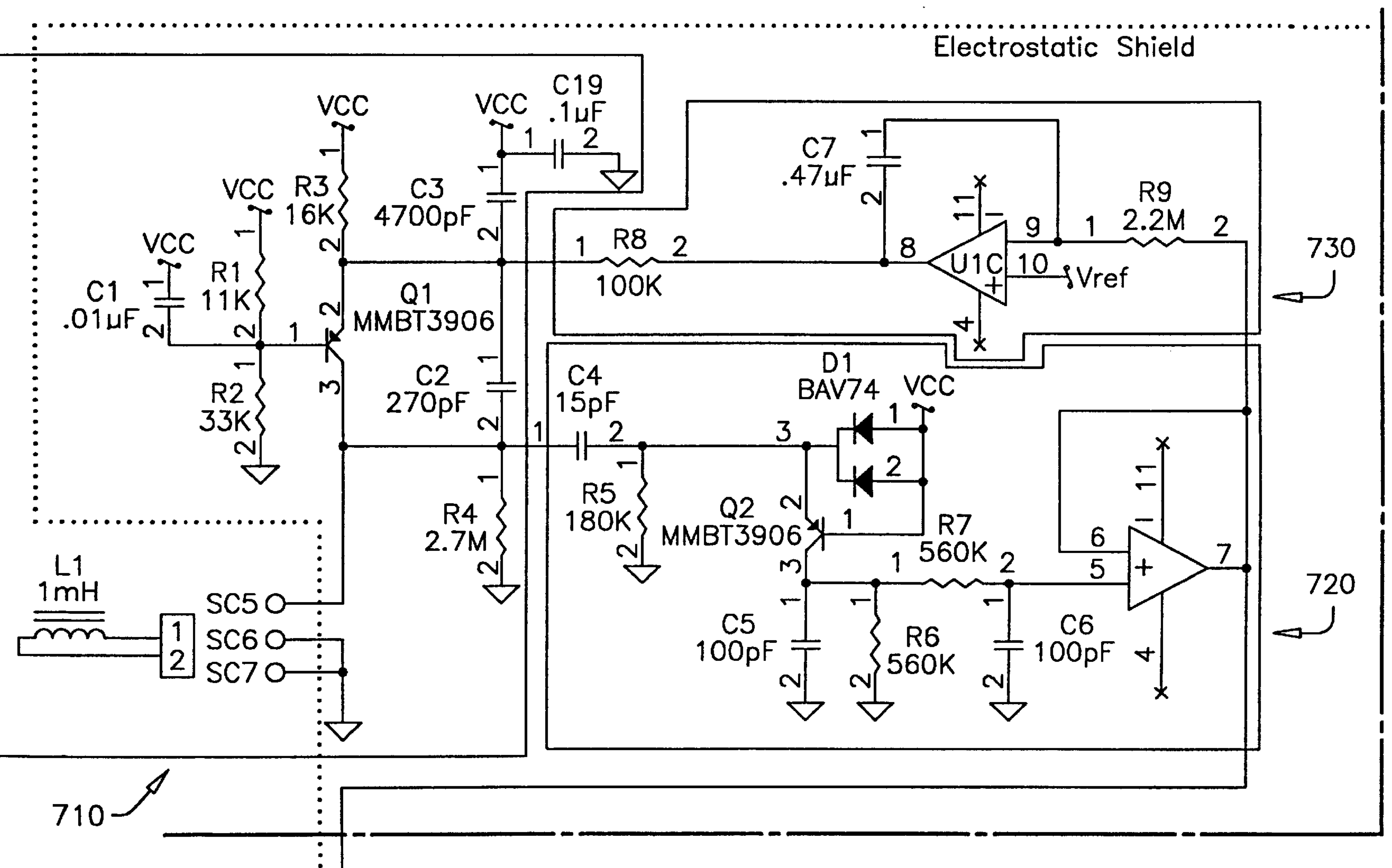
FIG. 7 illustrates a circuit used for sensing flow velocity in the flow sensor according to an embodiment of the present invention.
Figure 7B:
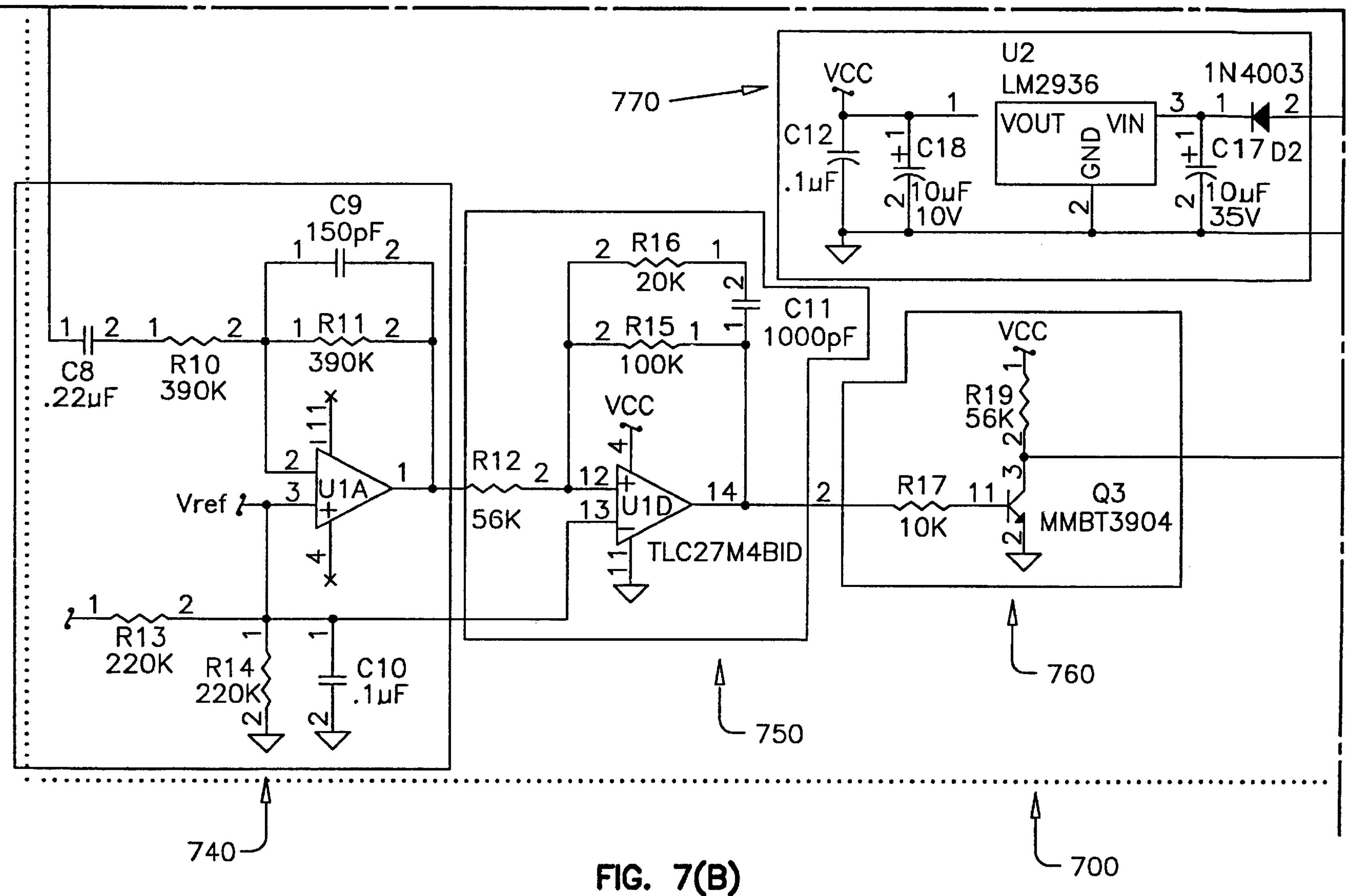
Figure 7C:
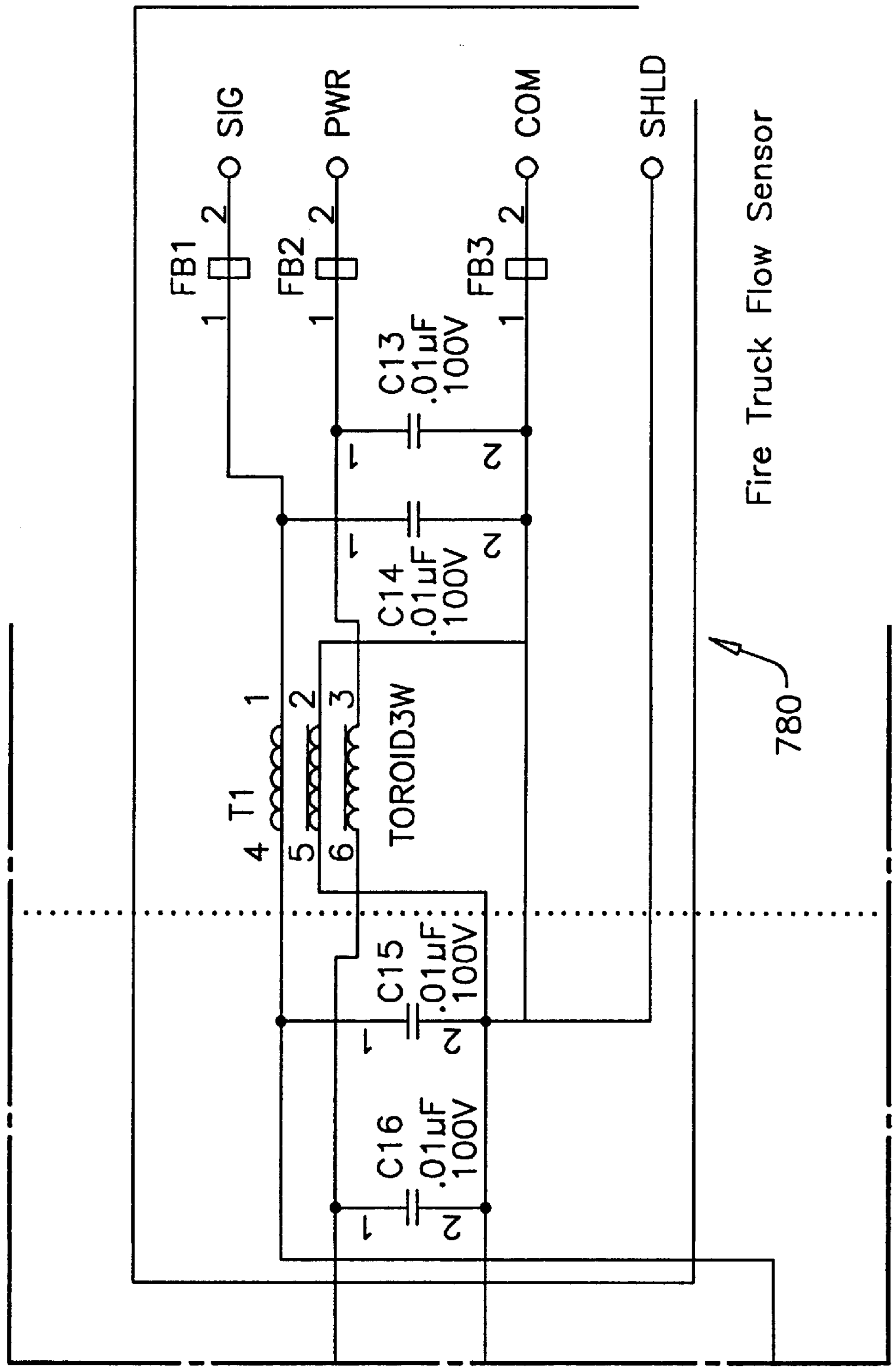

With reference to FIG. 7, an eddy current type circuit 700 is utilized for sensing fluid flow. The circuit 700 comprises an oscillator 710, a signal amplitude detector and buffer 720, a control loop integrator 730, a bandwidth limiter 740, a switching comparator 750, an output interface 760, a power supply 770 and an EMI filtering/reverse voltage protection component 780. The sensor employs a metal impeller, preferably austenitic stainless steel, in the flow stream and a coil and sensing circuitry located in the sensor. The sensor design produces an output pulse each time a blade tip passes by its closest approach to the sensing coil regardless of the direction of rotation. The impeller blade tip, at its closest approach to the coil would be no nearer than 15/100th of an inch.

The inductor of oscillator circuit 710 functions as the sensing coil. The presence of metal in the magnetic field of the coil leads to a variation in the modulation of the Q factor. As the metal gets closer to the coil, a change in the field occurs. This change manifests itself as a loss in the field as a current is set up. The closer the metal is to the coil, the greater the loss in the field and thus a decrease in signal amplitude. This decrease is the result of the control loop, comprised of the oscillator 710, a signal amplitude detector and buffer 720, and a control loop integrator 730, and which maintains a long-term fixed current bias to the oscillator, thus optimizing the sensitivity of the detector. Since this current is fixed, additional losses in the magnetic field due to the proximity of the impeller, decrease the amplitude of the oscillator signal. The coil is designed using a P type ferrite core which has a partially open magnetic path thus permitting this change in the field loss. The circuit is designed to operate at a nominal frequency of 300 kHz to allow reasonable sensitivity to the impeller blade. A significantly lower frequency would result in a lower sensitivity due to the relatively narrow thickness of the impeller while a much higher frequency would also result in diminished sensitivity due to higher losses in the ferrite core.

The function of the signal amplitude detector and buffer 720 is to produce a voltage proportional to the signal amplitude of the detector coil while having little adverse effect on the Q of the oscillator. The buffered output of this circuit is presented to both the control loop integrator 730 and the bandwidth limiter 740. The control loop thus maintains an optimal signal level on the coil without the addition of more conventional trimming adjustments.

The control loop integrator circuit 730 compares the long term average amplitude of the oscillator to a reference voltage. The purpose of these components is to maintain a stable and constant excitation signal on the coil without impacting the Q of the oscillator 710. A maximum Q is maintained without limiting the amplitude of the oscillator. Thus, a maximum sensitivity to the passing impeller blade is achieved.

The signal from the signal amplitude detector and buffer 720 is bandwidth limited by the bandwidth limiter circuit 740 to correspond with the impeller rate which ranges from 1 Hz to 1 kHz prior to pulse forming. A sinusoidal wave is converted into a square wave. This approach yields a better behaved sensor by eliminating low frequency toggling below normal minimal flow rates and also minimizes the effects of noise present at frequencies in excess of the maximum equivalent flow rate.

The limited signal from the limiter circuit 740 is squared-up by the switching and comparator circuit 750 with hysteresis. The comparator 750 assures a single, clean output pulse for each blade transition.

The output interface component 760 limits the maximum output pulse width and the maximum output current to predetermined values. By limiting these variables, the sensor is protected from a short circuit in the external wiring.

A power supply 770 provides a standard regulated low power of 5 volts. The reverse voltage protection circuit 780 protects the sensor circuit 700 from the effects of EMI/RFI and reverse voltages.

The present invention has been described in terms of specific embodiments to facilitate understanding. The above embodiments, however, are illustrative rather than restrictive. It will be readily apparent to one skilled in the art that departures may be made from the specific embodiments shown above without departing from the central spirit and scope of the invention. Therefore, the invention should not be regarded as being limited to the above examples, but should be regarded instead as being fully commensurate in scope with the following claims.

What is claimed is:

1. An impeller comprising:

a plurality of substantially semi-circular blade portions each defining a generally planar surface disposed substantially perpendicular to a flow path to allow the impeller to be rotated;

a cylindrical hub portion having two ends each having an opening, the openings defining a longitudinal passage within the hub portion;

an anti-friction bearing means, positioned within the hub portion, the bearing means acting as a radial bearing for rotation of the impeller and as a thrust bearing against a wall of an impeller housing;

an axle for rotatably mounting the impeller to the impeller housing, the axle being rotatably enclosed by the anti-friction bearing means; and a plurality of stem portions extending outward from a circumference of the hub portion and spaced apart at an equal distance with respect to each other wherein each of the stem portions connect the hub portion to one of the blade portions.

2. The impeller of claim 1 wherein a circular end of the blade portion is distal from the stem portion and a straight end of the blade portion is proximal to the stem portion.

3. The impeller of claim 1 wherein each of the stem portions forms a first junction with a straight end of the corresponding blade portion and a second junction with the hub portion.

4. The impeller of claim 3 wherein a thickness of the stem portion at the second junction is greater than a thickness at the first junction for increasing the hydrodynamic efficiency of the blade portion and for improving manufacturability.

5. The impeller of claim 4 wherein a length of the straight end of the blade portion is greater than the width of the stem portion.

6. A flow sensor, for measuring velocity of a fluid flowing through a fluid conduit, comprising:

an impeller housing having a first and a second end with the first end having a concave opening, the housing being mountable to a periphery of a fluid conduit and providing means for adjusting a distance the impeller housing protrudes into the conduit;

an impeller, including a paddle wheel having a plurality of semi-circular blade portions each defining a generally planar surface disposed substantially perpendicular to a flow path to allow the impeller to be rotated and extending radially outwardly from an axle, the axle being attached to the impeller housing such that the impeller is rotatably mounted in the concave opening of the impeller housing and at least one of the blade portions extends outside of the impeller housing beyond the first end of the impeller housing and is oriented perpendicular to the direction of fluid flow;

an inductive pickup disposed within the impeller housing proximate the second end of the impeller housing, the inductive pickup producing a signal when the impeller blade portions rotate through an inductive field;

a sensing circuitry connected to the impeller housing for determining a velocity of a fluid in response to a signal from the inductive pickup, the circuitry containing an oscillation means for exciting the pickup and a control loop; and a coil wherein the control loop maintains an optimal signal level at the coil.

7. The flow sensor of claim 6 wherein the concave opening defines a skirt area.

8. The flow sensor of claim 6 wherein at least two of the blade portions are positioned within the skirt area defined by the concave opening of the impeller housing.

9. The flow sensor of claim 6 wherein the conduit is a pipe.

10. The flow sensor of claim 6 wherein the impeller is fabricated of non-magnetic austenitic stainless steel.

11. The flow sensor of claim 10 wherein the optimal signal level is maintained at the coil without an addition of trimming adjustments to the control loop.

12. The flow sensor of claim 10 wherein the rate of rotation of the blade portion is linearly proportional to the fluid flow velocity.

13. The flow sensor of claim 10 wherein the impeller further comprises:

a cylindrical hub portion having two ends each having an opening, the openings defining a longitudinal passage within the hub portion;

an anti-friction bearing means, positioned within the hub portion, the bearing means acting as a radial bearing for a rotation of the impeller and as a thrust bearing against a wall of the impeller housing; and a plurality of stem portions extending outward from a circumference of the hub portion and spaced apart at an equal distance with respect to each other wherein the bearing encloses the axle and each of the stem portions connect the hub portion to one of the blade portions.

14. The flow sensor of claim 13 wherein the bearing means is made of low friction plastic material and the stem portions are made of corrosion resistant material.

15. The flow sensor of claim 13 wherein a shape of each of the blade portions is substantially semi-circular.

16. The flow sensor of claim 15 wherein a circular end of the blade portion is distal from the stem portion and a straight end of the blade portion is proximal to the stem portion.

17. The flow sensor of claim 15 wherein each of the stem portions forms a first junction with a straight end of the corresponding blade portion and a second junction with the hub portion.

18. The flow sensor of claim 17 wherein a thickness of the stem portion at the second junction is greater than a thickness at the first junction for increasing the hydrodynamic efficiency of the blade portion and for improving manufacturability.

19. The flow sensor of claim 18 wherein the stem portions facilitate the shedding of fluid from the blade portions prior to the blade portions entering the skirt area.

20. The flow sensor of claim 19 wherein a reduction of fluid on the blade portions results in a reduction of a cavitational backflow within the skirt area leading to an increased precision in the fluid flow rate measurements.

21. The flow sensor of claim 19 wherein a length of the straight end of the blade portion is greater than the width of the stem portion.

22. A paddle wheel impeller for an insertion flow sensor comprising:

a plurality of blade portions, each of the blade portions having an outer edge having a shape of a circular section and each of the blade portions defining a generally flat planar front side surface disposed substantially perpendicular to a flow path to allow the paddle wheel impeller to be rotated;

a cylindrical hub portion; and a plurality of stem portions extending radially outwardly from the hub portion, each of the blade portions being connected to the hub portion by a single corresponding stem portion.

23. The paddle wheel impeller of claim 22, wherein each of the plurality of blade portions has a generally flat planar back side surface generally parallel to the front side surface.

24. The paddle wheel impeller of claim 23, wherein each of the stem portions has a width which is smaller than a width of each of the blade portions.

25. The paddle wheel impeller of claim 24, wherein each of the stem portions includes two sides defining the width of the corresponding stem portion and each of the two sides extends substantially perpendicular to the cylindrical hub.

26. The paddle wheel impeller of claim 24, wherein the outer edge circular sections of the blade portions are distal from the stem portions and each of the blade portions further having a substantially straight inner edge portion, the substantially straight inner edge portion of each blade portion being proximal to and joining the corresponding stem portion.

27. The paddle wheel impeller of claim 22, wherein the outer edge circular sections of the blade portions are distal from the stem portions and each of the blade portions further including a substantially straight inner edge portion, the substantially straight inner edge portion of each blade portion being proximal to and joining the corresponding stem portion.

28. The paddle wheel impeller of claim 22, wherein each of the stem portions forms a first junction with a straight end of a corresponding blade portion and a second junction with the hub portion.

29. The paddle wheel impeller of claim 28, wherein a thickness of the stem portion at the second junction is greater than a thickness at the first junction.

30. An insertion flow sensor for measuring velocity of a fluid flowing through a fluid conduit comprising:

a cylindrical impeller housing having a first and a second end with the first end having a concave opening defining a skirt area, the cylindrical impeller housing capable of being inserted into and mounted to a periphery of a fluid conduit;

a paddle wheel impeller including a plurality of blade portions, each of the blade portions having an outer edge having a shape of a circular section and each of the blade portions defining a generally planar surface disposed substantially perpendicular to the fluid flow to allow the paddle wheel impeller to be rotated, the impeller further including a plurality of stem portions extending radially outwardly from a cylindrical hub portion, each of the blade portions being connected to the hub portion by a single corresponding stem portion, the cylindrical hub portion of the paddle wheel impeller being rotatably attached to the impeller housing such that the impeller is partially mounted within the concave opening of the impeller housing;

an inductive pickup disposed within the impeller housing, the inductive pickup producing a signal when the impeller blade portions rotate through an inductive field; and sensing circuitry supported within the impeller housing for determining a velocity of the fluid flow in response to a signal from the inductive pickup.

31. An insertion flow sensor for measuring velocity of a fluid flowing through a fluid conduit comprising:

a cylindrical impeller housing having a first and a second end with the first end having a concave opening defining a skirt area for preventing impingement of the fluid into the skirt area, the skirt area defined partially by a circular inner sidewall portion of the cylindrical impeller housing, the circular inner sidewall portion having a curvature; and a paddle wheel impeller including a plurality of blade portions, each of the blade portions having an outer edge having a shape of a circular section and each of the blade portions defining a generally planar surface disposed substantially perpendicular to the fluid flow to allow the paddle wheel impeller to be rotated, the impeller further including a plurality of stem portions extending radially outwardly from a cylindrical hub portion, each blade portion being connected to the hub portion by a single corresponding stem portion, each blade portion having an outer edge in the shape of a circular section with a curvature substantially corresponding to the curvature of the circular inner sidewall portion of the impeller housing, the cylindrical hub portion of the paddle wheel impeller being rotatably attached to the impeller housing such that the impeller is partially mounted within the concave opening of the impeller housing.

32. The insertion flow sensor of claim 31, wherein the circular inner sidewall portion of the impeller housing defines a diameter and the paddle wheel impeller has a diameter which is slightly smaller than the diameter of the circular inner sidewall portion such that the impeller is capable of rotating freely when attached to the impeller housing.

* * * * *